United States Patent [19]

Takayama

[11] Patent Number: 5,010,436
[45] Date of Patent: Apr. 23, 1991

[54] APPARATUS FOR INCORPORATING LOCK PLATES IN VIDEO CASSETTES

[75] Inventor: Naoto Takayama, Kanagawa, Japan

[73] Assignee: Fuji Photo Film Co., Ltd., Kanagawa, Japan

[21] Appl. No.: 413,670

[22] Filed: Sep. 28, 1989

[30] Foreign Application Priority Data

Sep. 29, 1988 [JP] Japan ................................. 63-245796
Oct. 4, 1988 [JP] Japan ........................... 63-130211[U]

[51] Int. Cl.⁵ ........................................ G11B 23/113
[52] U.S. Cl. .................................................. 360/137
[58] Field of Search ............................. 360/137, 132; 242/197–199

[56] References Cited

U.S. PATENT DOCUMENTS 4,475,700 10/1984 MacLeon, Jr. et al. ............ 242/197
4,928,197 5/1990 Park et al. ............................ 360/132

Primary Examiner—David J. Severin
Attorney, Agent, or Firm—Sughrue, Mion, Zinn Macpeak & Seas

[57] ABSTRACT

A lock plate which comprises a plate body having protrusions, a shaft combined with and extending parallel to the plane of the plate body, and a torsion spring having a coiled portion engaged with the shaft is incorporated in the cassette case body of a video cassette in order to allow a guard panel to be locked in a closed position. The guard panel is mounted on a surface of the cassette case body, along which surface the magnetic tape slides. An apparatus for incorporating a lock plate in a video cassette comprises a plate holding device which holds the lock plate in an inclined orientation so that the surface of the plate body, on which surface the protrusions are formed, faces down obliquely and so that the shaft extends horizontally above the plate body. A fitting device grasps the lock plate held by the plate holding device, moves it linearly while keeping it in the inclined orientation, and thereby fits it into the cassette case body.

4 Claims, 6 Drawing Sheets

APPARATUS FOR INCORPORATING LOCK PLATES IN VIDEO CASSETTES

BACKGROUND OF THE INVENTION

1. Field of the Invention

This invention relates to an apparatus for incorporating a lock plate in the cassette case body of a video cassette which accommodates a magnetic tape. This invention also relates to a magnetic tape cassette which is composed of a cassette case body and a guard panel and which is provided with a lock plate for locking the guard panel in its closed position.

2. Description of the Prior Art

Figure 4:
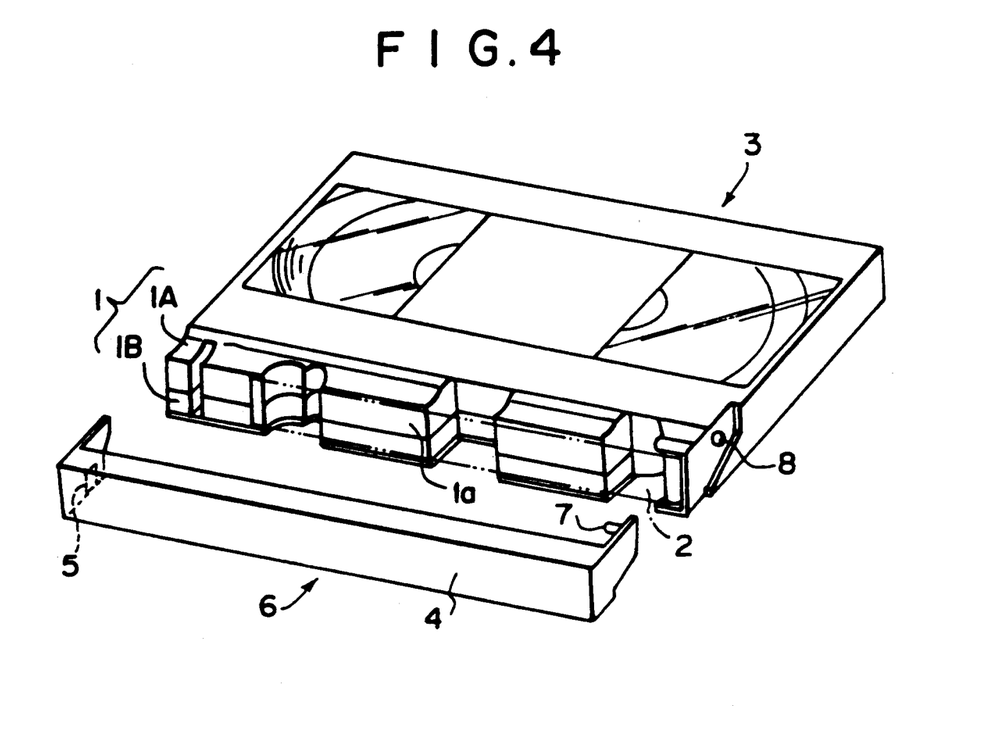
FIG. 4 is a perspective view showing a video cassette.

Magnetic tape cassettes comprising a case which accommodates a magnetic tape have heretofore been used widely. FIG. 4 is a perspective view showing a video cassette, which is one type of magnetic tape cassette. With reference to FIG. 4, the video cassette comprises a cassette case body 3 having a case 1, which is composed of an upper case half 1A and a lower case half 1B and which accommodates a magnetic tape 2. The cassette case body 3 has a surface 1a along which the magnetic tape 2 moves, and a guard panel 6 which is provided on the surface 1a and which comprises a guard member 4 positioned parallel to the surface 1a. The guard panel 6 has a shaft 7 at its side and is rotatably mounted on the cassette case body 3. The shaft 7 is engaged with a hole 8 of the case 1 so that the guard member 4 can be moved between a closed position in which the portion of the magnetic tape 2 located on the surface 1a is covered and an open position retracted from the surface 1a in which the portion of the magnetic tape 2 located on the surface 1a is laid bare.

Figure 5:
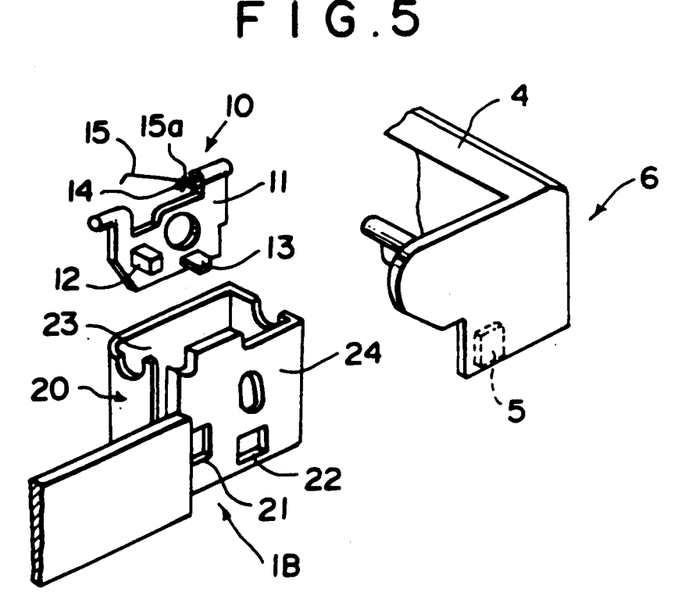
FIG. 5 is an exploded perspective view showing the major part of the video cassette.

Also, a lock plate, which locks the guard panel 6 in its closed position when the video cassette is not being used, is located in the cassette case body 3. FIG. 5 is an exploded perspective view showing the major parts of the video cassette. Specifically, as shown in FIG. 5, a lock plate 10 comprises a sheet-like plate body 11, a first protrusion 12 and a second protrusion 13 which protrude from the plate body 11 in a direction approximately normal thereto, a shaft 14 which is combined integrally with the plate body 11 and extends horizontally, and a torsion spring 15 having a coiled portion 15a engaged with the shaft 14. The lock plate 10 is fitted in a lock plate mount 20, which is located at a side edge of the lower case half 1B. A side wall 24 of the lock plate mount 20 has holes 21 and 22. The lock plate 10 is fitted in the lock plate mount 20 with the protrusions 12 and 13 respectively engaged with the holes 21 and 22. At this time, one leg portion of the torsion spring 15 is located so that it is in contact with a rear surface of the plate body 11 (i.e. the surface opposite to the surface on which the protrusions 12 and 13 are provided). The other leg portion of the torsion spring 15 is located so that it is in contact with an inner wall surface 23 of the lock plate mount 20, which inner wall surface faces the rear surface of the plate body 11. Accordingly, the torsion spring 15 forces the protrusions 12 and 13 to project from the lock plate mount 20 through the holes 21 and 22. A recess 5, which is capable of engaging with the protrusion 13, is formed in the inner side surface of the guard panel 6. The protrusion 13, which is forced to protrude outwardly from the lock plate mount 20, engages with the recess 5 when the guard panel 6 is to be locked in the closed position. Therefore, the guard panel 6 is prevented from rotating to the open position.

The protrusion 12 is not covered by the guard panel 6. When the video cassette is fitted into a cassette deck, a member of the cassette deck pushes the protrusion 12, which causes the lock plate 10 to be pushed into the cassette case body 3 and thereby releases the lock of the guard panel 6.

Figure 6A:
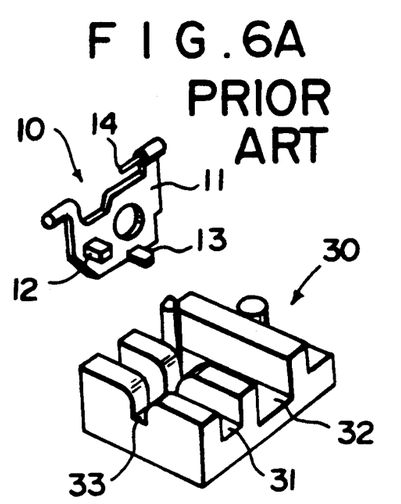
FIGS. 6A, 6B and 8 are perspective views showing a conventional plate holding means together with a lock plate.
Figure 6B:
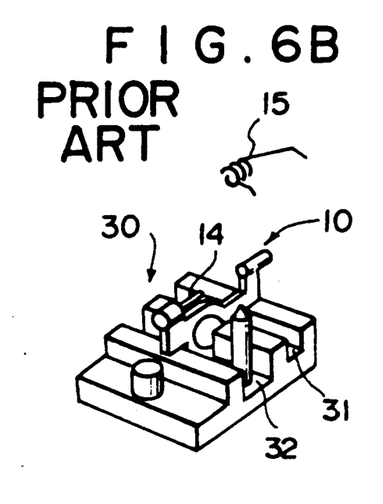
Figure 7:
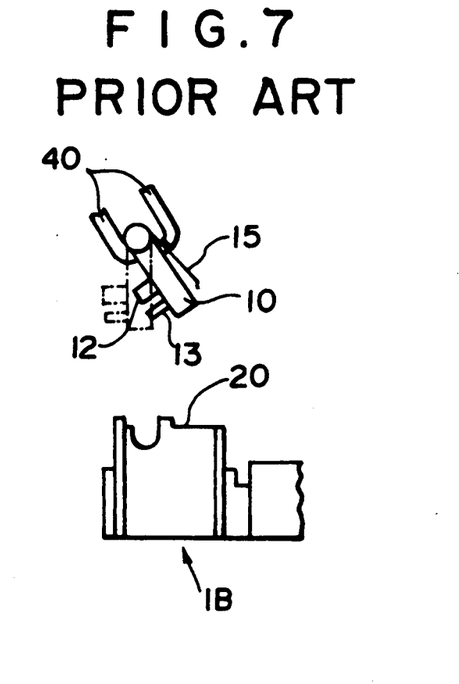
FIG. 7 is a schematic view showing a conventional fitting means, which grasps a lock plate, and a lower case half.

In order to incorporate the lock plate 10 in the cassette case body 3, a plate holding means 30 as shown in FIGS. 6A and 6B and a fitting means 40 as shown in FIG. 7 are provided.

Specifically, a plurality of lock plates 10, 10, ... are fed one after another by a parts feeder (not shown) to the plate holding means 30. As shown in FIG. 6A, a lock plate 10 is held upright on the plate holding means 30 with the plate body 11 inserted in a holding part 33 of the plate holding means 30. The plate holding means 30 has grooves 31 and 32 for receiving the protrusions 12 and 13. Thereafter, a torsion spring 15 is fed toward the lock plate 10 by a parts feeder (not shown) and engaged with the shaft 14 of the lock plate 10. The plate holding means 30, on which the lock plate 10 is being held, is then conveyed to a position at which a lower case half 1B of the cassette case is located. At said position, the lock plate 10 is grasped by the fitting means 40 composed of a pair of grasping members as shown in FIG. 7. The lock plate 10 is thus taken out of the plate holding means 30, and fitted in the lower case half 1B of the cassette case body.

However, the plate holding means 30 holds the lock plate 10 upright. Therefore, when the lock plate 10 is taken up from the plate holding means 30 by the fitting means 40, moved horizontally and then moved down to the lower case half 1B, the protrusions 12 and 13 of the lock plate 10 strike against the surface of the wall of the lock plate mount 20. Therefore, the lock plate 10 cannot be fitted smoothly into the lower case half 1B. In order to prevent this problem, before the fitting means 40 fits the lock plate 10 into the lower case half 1B, it must rotate the lock plate 10 from the position indicated by the chained line in FIG. 7 to the position indicated by the solid line. For this purpose, the fitting means 40 must be provided with a rotation mechanism for changing the inclination of the lock plate 10. As a result, the fitting means 40 has a complicated mechanism and is large in size. Also, the unit which supports the fitting means 40 must be very rigid and will be large. Such an apparatus for incorporating a lock plate in a video cassette is not suitable for quick incorporation of lock plates.

Figure 12:
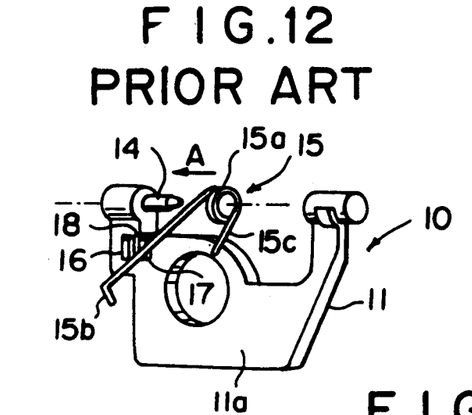
FIG. 12 is a perspective view showing a conventional lock plate.
Figure 13:
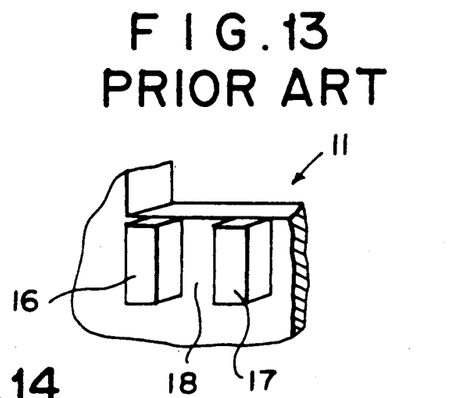
FIG. 13 is an enlarged perspective view showing projections on the conventional lock plate.
Figure 14:
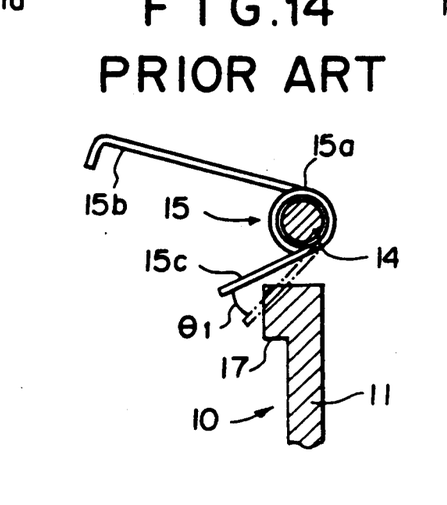
FIG. 14 is a sectional view showing the conventional lock plate.

The problems of conventional lock plates will be described hereinbelow. FIG. 12 is a perspective view showing a conventional lock plate. FIG. 13 is an enlarged perspective view showing the projections on the conventional lock plate. FIG. 14 is a sectional view showing the conventional lock plate.

With reference to FIG. 12, projections 16 and 17 are formed on a rear surface 11a of the plate body 11, which surface comes into contact with a leg portion 15c of the torsion spring 15. The projections 16 and 17 are formed side by side in the direction along which the shaft 14 extends. The leg portion 15c is fitted in a groove 18 defined by the projections 16 and 17.

Before the lock plate 10 is incorporated in the aforesaid cassette case body 3, the torsion spring 15 is engaged with the plate body 11. However, with the conventional technique, failures readily arise during the engagement of the torsion spring 15. Specifically, as shown in FIG. 12, the torsion spring 15 is moved along the shaft 14 in the direction indicated by the arrow A until a coiled portion 15a engages with the shaft 14. At this time, as shown in FIG. 14, the torsion spring 15 is rotated by an angle $\theta 1$ from a predetermined mounting position so that the leg portion 15c does not strike against the projection 17 located on the upstream side as viewed in the direction along which the torsion spring 15 moves. However, as shown in FIG. 13, the projection 17 has a rectangular parallelopiped shape. Therefore, if the position to which the torsion spring 15 is rotated during fitting to the shaft 14 fluctuates or if the angle between the leg portions 15b and 15c fluctuates in the process of forming the torsion spring 15, the leg portion 15c will readily strike against the upper edge of the projection 17, and it cannot therefore be fitted accurately in the groove 18. Also, if the relationship between the positions of the torsion spring 15 and the projections 16, 17 fluctuates during engagement, the leg portion 15c will get stuck on the projections 16 and 17, and therefore the torsion spring 15 cannot accurately be engaged with the shaft 14.

SUMMARY OF THE INVENTION

The primary object of the present invention is to provide an apparatus for incorporating a lock plate in a video cassette, wherein the lock plate is incorporated quickly with a fitting means having a simple configuration.

Another object of the present invention is to provide a magnetic tape cassette which is provided with a lock plate constructed so that a torsion spring can reliably be engaged with a shaft of the lock plate.

The present invention provides an apparatus for incorporating a lock plate in a video cassette, wherein a lock plate composed of:
(a) a sheet-like plate body,
(b) protrusions protruding from the plate body in a direction approximately normal thereto,
(c) a shaft combined integrally with the plate body and extending adjacent and approximately parallel to the plate body, and
(d) a torsion spring having a coiled portion engaged with the shaft, is incorporated in a cassette case body of a video cassette in order to allow a guard panel of the video cassette to be locked in a closed position, which video cassette is composed of the cassette case body in which a magnetic tape is accommodated, and the guard panel mounted on a surface of the cassette case body, along which surface the magnetic tape slides, the apparatus for incorporating a lock plate in a video cassette comprising:
(i) a plate holding means which holds said lock plate in an obliquely inclined orientation so that the surface of said plate body, on which surface said protrusions are formed, faces down obliquely and so that said shaft extends horizontally above said plate body, and
(ii) a fitting means which grasps the lock plate held by said plate holding means, moves it linearly while keeping it in the inclined orientation, and thereby fits said lock plate into said cassette case body.

With the apparatus for incorporating a lock plate in a video cassette in accordance with the present invention, the plate holding means holds the lock plate in an obliquely inclined orientation. Therefore, the fitting means can smoothly fit the lock plate into the cassette case body by moving it linearly without rotating it. Accordingly, it is only necessary that the fitting means be provided with a mechanism for moving the lock plate linearly, and the fitting means can be kept simple in configuration, light in weight and small in size. As a result, the unit which supports the fitting means can be kept light in weight and small in size. Also, with the apparatus for incorporating a lock plate in a video cassette in accordance with the present invention, lock plates can be quickly incorporated in cassette case bodies. The angle of inclination of the lock plate held on the plate holding means may be determined in accordance with the heights of the protrusions of the lock plate, so that the lock plate can be fitted into the cassette case body without the angle of inclination of the lock plate being changed.

Figure 8:
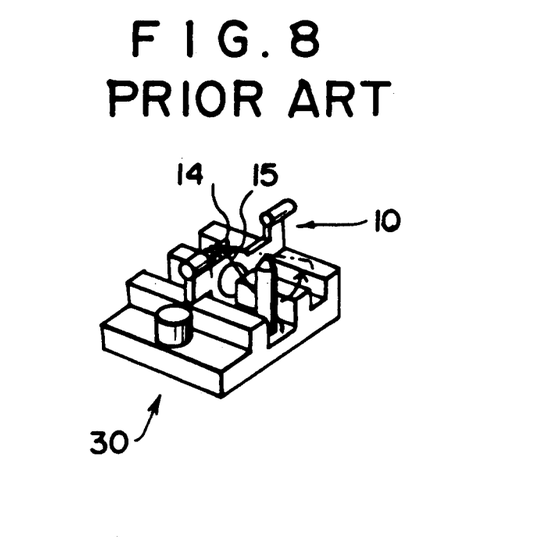

As shown in FIG. 8, the conventional plate holding means 30 has no means for fixing the torsion spring 15 at the position in which it is engaged with the shaft 14. Therefore, a problem arises in that, when the plate holding means 30 is moved quickly, the torsion spring 15 turns undesirably as indicated by the chained line. In order to prevent this problem, the plate holding means of the apparatus for incorporating a lock plate in a video cassette in accordance with the present invention should preferably be provided with a spring push means which pushes the leg portion of the torsion spring 15 against the surface of the plate body on the side opposite to the surface on which the protrusions are formed.

The present invention also provides a magnetic tape cassette comprising:
(i) a cassette case body in which a magnetic tape is accommodated,
(ii) a guard panel mounted on a surface of the cassette case body, along which surface the magnetic tape slides, and
(iii) a lock plate which is fitted in the cassette case body and which is composed of:
(a) a sheet like plate body,
(b) protrusions protruding from the plate body in a direction approximately normal thereto,
(c) a shaft combined integrally with the plate body and extending adjacent and approximately parallel to the plate body, and
(d) a torsion spring comprising a coiled portion and two leg portions extending in different directions from the coiled portion, said coiled portion having been moved along the shaft and engaged with the shaft,
said protrusions being made to project outwardly from said cassette case body by the urging force of said torsion spring so that one of said protrusions engages with said guard panel, thereby fixing said guard panel in a position in which it faces said surface of the cassette case body, along which surface the magnetic tape slides,
wherein the improvement comprises:
two projections being provided on the surface of said plate body on the side opposite to the surface from which said protrusions protrude, so that two said projections stand side by side in the direction along which said shaft extends,
said torsion spring being located so that one of two said leg portions is in contact with a wall formed in said cassette case body, and the other of two said leg portions is in contact with said plate body and is positioned between two said projections, the inner wall surfaces of two said projections, which surfaces face each other, are beveled and form first beveled surfaces which make the space between two said projections gradually narrower toward said plate body, and an edge of one of two said projections, which is located upstream from the other projection as viewed in the direction along which said coiled portion moves, which edge is close to said shaft, is beveled and forms a second beveled surface which gradually reduces the height of said one projection toward said shaft.

With the magnetic tape cassette in accordance with the present invention, the two projections of the plate body are provided with the first beveled surfaces. Therefore, even if the relationship between the positions of the torsion spring and the projections fluctuates when the torsion spring is engaged with the shaft, the leg portion of the torsion spring is guided along the first beveled surfaces into the groove defined by the two projections, and the problem of the leg portion getting stuck on the projections does not arise. Also, the edge of one projection, which is located upstream from the other projection as viewed in the direction along which the torsion spring moves, is beveled and forms the second beveled surface. Therefore, even if the inclination of the leg portion fluctuates, the leg portion does not strike against the projection, and the torsion spring can be reliably engaged with the shaft of the lock plate. Accordingly, the yield in the process for manufacturing lock plates can be kept high, and magnetic tape cassettes can be manufactured efficiently.

DESCRIPTION OF THE PREFERRED EMBODIMENTS

The present invention will hereinbelow be described in further detail with reference to the accompanying drawings.

Figure 1:
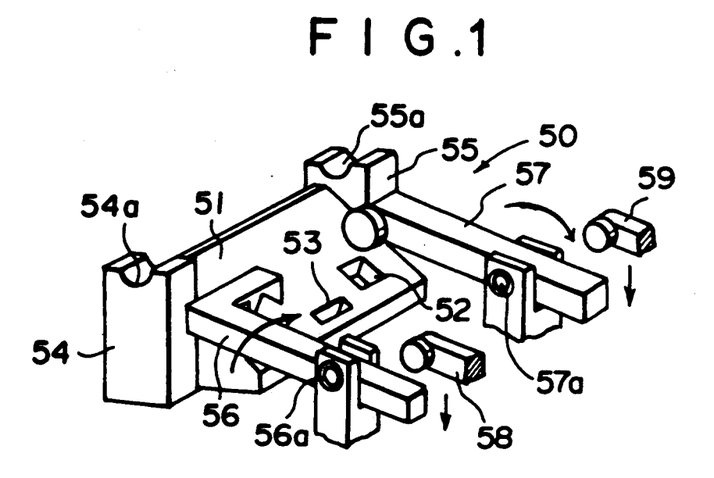
FIG. 1 is a perspective view showing a plate holding means in an embodiment of the apparatus for incorporating a lock plate in a video cassette in accordance with the present invention.

FIG. 1 is a perspective view showing a plate holding means in an embodiment of the apparatus for incorporating a lock plate in a video cassette in accordance with the present invention. The lock plate itself, which is incorporated in a cassette case body of this embodiment, has the same configuration as the lock plate 10 described above with reference to FIG. 5.

With reference to FIG. 1, a plate holding means 50 has a plate holding surface 51 which is inclined obliquely. The plate holding surface 51 has recesses 52 and 53 which receive two protrusions on a lock plate. A pair of stays 54 and 55 are located adjacent to both sides of the plate holding surface 51. Upper surfaces of the stays 54 and 55 respectively have grooves 54a and 55a on which upper parts of the lock plate are to be placed. Also, a spring push arm 56 and a plate push arm 57 are located on the plate holding surface 51. Left edges of the spring push arm 56 and the plate push arm 57 are pushed toward the plate holding surface 51 by springs (not shown) or the like. The spring push arm 56 and the plate push arm 57 can be rotated around shafts 56a and 57a. Arm push means 58 and 59 are respectively located above the right edges of the spring push arm 56 and the plate push arm 57 and move down in order to cause the left edges of the spring push arm 56 and the plate push arm 57 to move up.

Figure 2:
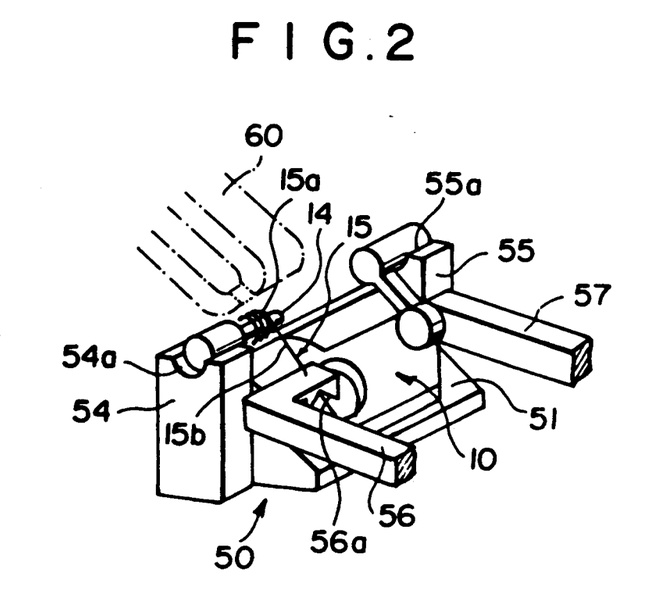
FIG. 2 is a perspective view showing the plate holding means, which holds a lock plate.

In the course of the lock plate being held by the plate holding means 50, the arm push means 58 and 59 respectively push the right edges of the spring push arm 56 and the plate push arm 57 down in order to move the left edges of the spring push arm 56 and the plate push arm 57 away from the plate holding surface 51. Thereafter, as shown in FIG. 2, a lock plate 10 is fed onto the plate holding surface 51 so that the surface of the lock plate 10, on which the aforesaid protrusions 12 and 13 (not shown in FIG. 2) are formed, faces down. The protrusions 12 and 13 engage respectively with the recesses 52 and 53, and the upper part provided with the shaft 14 and the other upper part of the lock plate 10 rest in the grooves 54a and 55a. In this manner, the lock plate 10 is positioned on the plate holding means 50. Thereafter, the arm push means 59 moves up and away from the right edge of the plate push arm 57 in order to release it. Therefore, the left edge of the plate push arm 57 moves down and pushes the lock plate 10 against the plate holding surface 51, which prevents the lock plate 10 from moving. As shown in FIG. 2, a torsion spring 15 is mounted so that the coiled portion 15a engages with the shaft 14 of the lock plate 10, and then the arm push means 58 moves up away from the right edge of the spring push arm 56 in order to release it. The left edge of the spring push arm 56 has a notch 56a which receives the leg portion 15b of the torsion spring 15. The notch 56a holds the leg portion 15b and prevents the torsion spring 15 from rotating around the shaft 14. Therefore, when the plate holding means 50, which holds the lock plate 10 on the plate holding surface 51, is moved quickly to a position at which the lock plate 10 is incorporated in a video cassette, the torsion spring 15 is reliably kept in a predetermined mounting position. In cases where, for example, the speed at which the plate holding means 50 moves is comparatively slow, and there is no risk that the torsion spring 15 will rotate around the shaft or that the plate body of the lock plate 10 will fall from the plate holding surface 51, the spring push arm 56 and the plate push arm 57 need not necessarily be provided.

Figure 3:
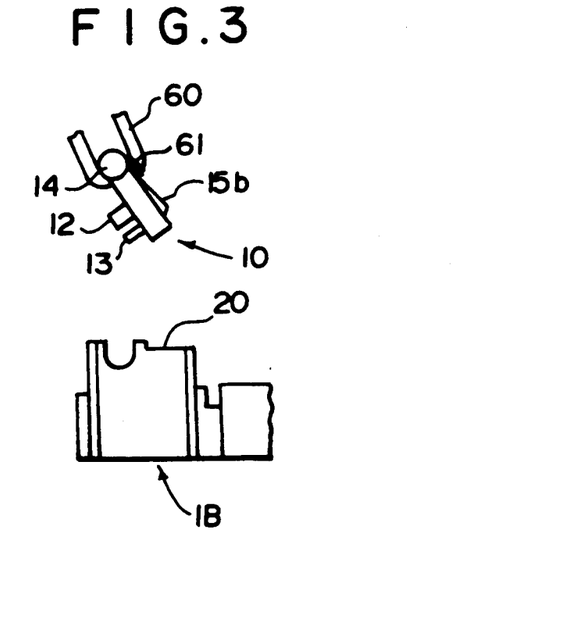
FIG. 3 is a schematic view showing a fitting means which grasps a lock plate, and a lower case half.

After the plate holding means 50 which holds the lock plate 10 is moved to the position at which the lock plate 10 is incorporated in a video cassette, the left edges of the spring push arm 56 and the plate push arm 57 are moved up by the arm push means 58 and 59. As shown in FIG. 3, the lock plate 10 is then grasped and taken out of the plate holding means 50 by a fitting means 60 composed of a pair of grasping members. The grasping member of the fitting means 60, which member is located on the side of the leg portion 15b of the torsion spring 15, has a step-like part 61 which defines the position of the leg portion 15b. The leg portion 15b is pushed by the step-like part 61 toward the plate body 11, and the torsion spring 15 is fitted by the fitting means 60 into the lower case half 1B.

The lock plate 10 was held by the plate holding means 50 in an orientation in which it was obliquely inclined at a predetermined angle. Therefore, after the fitting means 60 takes the lock plate 10 out of the plate holding means 50, it can incorporate the lock plate 10 in the lower case half 1B simply by moving the lock plate 10 linearly, for example, in a horizontal or vertical direction. The plate holding surface 51 of the plate holding means 50 is inclined at a predetermined angle so that the protrusions 12 and 13 of the lock plate 10 are not located more forwardly (i.e. more leftwardly in FIG. 2) than the shaft 14, and the lock plate 10 can be fed, without changing its orientation, into the aforesaid lock plate mount 20 of the lower case half 1B.

With the aforesaid embodiment, because the lock plate 10 is held in an obliquely inclined orientation by the plate holding means 50, the fitting means 60 can incorporate the lock plate 10 into the lower case half 1B of the cassette case body simply by grasping the lock plate 10 and moving it linearly. Therefore, the fitting means 60 need not be provided with a mechanism for rotating the lock plate, and can have a simple configuration and be small in size. The configurations of the plate holding means and the fitting means in the apparatus for incorporating a lock plate in a video cassette are not limited to those described above.

An embodiment of the magnetic tape cassette in accordance with the present invention will be described hereinbelow with reference to FIGS. 9, 10A, 10B and 11.

Figure 9:
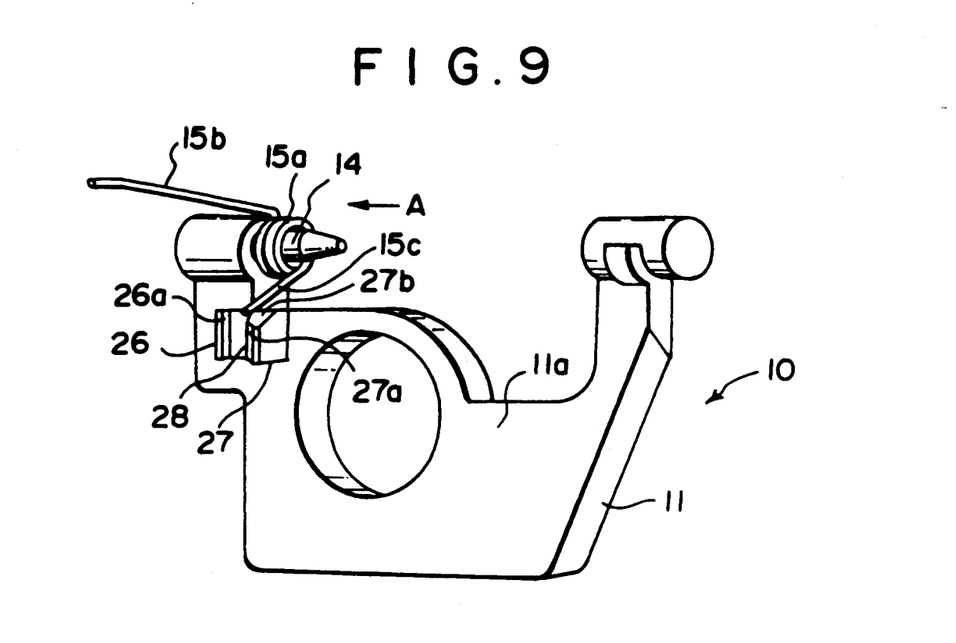
FIG. 9 is a perspective view showing a lock plate in an embodiment of the magnetic tape cassette in accordance with the present invention.

FIG. 9 is a perspective view showing a lock plate in an embodiment of the magnetic tape cassette in accordance with the present invention. In FIG. 9, similar elements of the lock plate are numbered with the same reference numerals with respect to FIG. 5. Also, the configurations of the parts of the magnetic tape cassette in accordance with the present invention other than the lock plate are the same as those described with reference to FIG. 4.

Figure 10A:
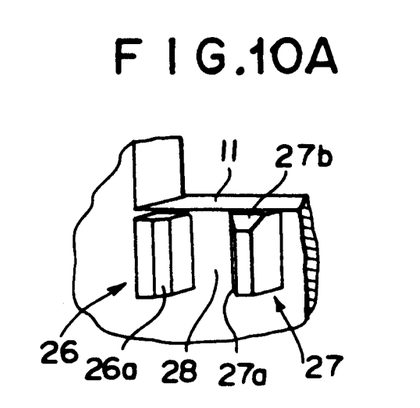
FIG. 10A is a perspective view showing projections on the lock plate.
Figure 10B:
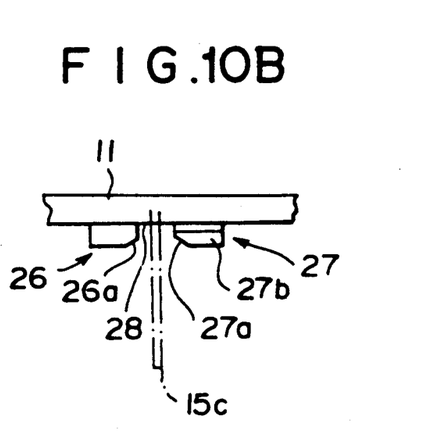
FIG. 10B is a plan view showing the projections on the lock plate.

With reference to FIG. 9, a rear surface 11a of the plate body 11 of the lock plate 10 is provided with projections 26 and 27 which stand side by side in the direction along which the shaft 14 extends. The torsion spring 15 has the coiled portion 15a, which engages with the shaft 14, and leg portions 15b and 15c. The leg portion 15c is located in a groove 28 defined by the projections 26 and 27. The torsion spring 15 is moved along the shaft 14 in the direction indicated by the arrow A and mounted on the lock plate 10. The projections 26 and 27 have beveled surfaces which enable the torsion spring 15 to be mounted reliably. FIGS. 10A and 10B are an enlarged perspective view and a plan view showing the projections 26 and 27.

Figure 11:
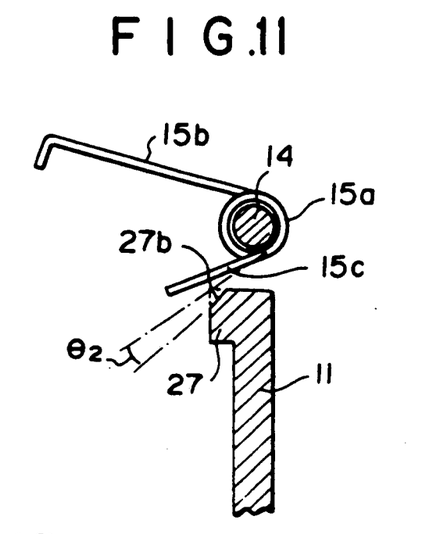
FIG. 11 is a sectional view showing the lock plate.

The inner wall surfaces of the projections 26 and 27, which surfaces face each other, are beveled and form first beveled surfaces 26a and 27a, which gradually reduce the space of the groove 28 toward the plate body 11. Also, an edge of the projection 27, which edge is located on the side of the shaft 14, is beveled and forms a second beveled surface 27b, which gradually reduces the height of the projection 27 toward the shaft 14. As shown in FIG. 11, when the torsion spring 15 is engaged with the shaft 14, the torsion spring 15 is inclined at a predetermined angle so that it does not strike against the projection 27. With a conventional technique, if the angle between the leg portions 15b and 15c of the torsion spring 15 fluctuates or the orientation of the torsion spring 15 with respect to the shaft 14 fluctuates, the leg portion 15c will strike against the projection 27. However, with this embodiment wherein the projection 27 is provided with the second beveled surface 27b, the leg portion 15c can reliably pass over the projection 27, and it is possible to eliminate the problem of the leg portion 15c striking against the projection 27, which keeps the torsion spring 15 from engaging with the shaft 14. In cases where the second beveled surface 27b is formed as shown in FIG. 11, the range of space through which the leg portion 15c can pass increases by the angle $\theta 2$ as compared with cases where no beveled surface 27b is provided.

If the torsion spring 15 is located in the correct position with respect to the projections 26 and 27 when it engages with the shaft 14, the leg portion 15c will be located in the groove 28 as indicated by the chained line in FIG. 1B. With conventional lock plates, if the leg portion 15c deviated to the right or left in FIG. 10B from the correct position with respect to the projections 26 and 27, the leg portion 15c would get stuck on the projections 26 and 27. However, with this embodiment, because the projections 26 and 27 respectively have the first beveled surfaces 26a and 27a, the leg portion 15c is reliably guided by the first beveled surfaces 26a and 27a into the groove 28. Therefore, the problem does not arise that the leg portion 15c gets stuck on the projections 26 and 27.

As described above, the projection 26 having the first beveled surface 26a and the projection 27 having the first and second beveled surfaces 27a and 27b are provided on the rear surface 11a of the plate body 11 of the lock plate 10. Therefore, it is possible to eliminate the problem of the leg portion 15c of the torsion spring 15 striking against the projections 26 and 27 or getting stuck on the projections 26 and 27, which keeps the torsion spring 15 from accurately engaging with the shaft 14. The angles of inclination and the areas of the beveled surfaces 26a, 27a and 27b may be selected appropriately in accordance with the shape and thickness of the torsion spring 15, the heights of the projections 26 and 27, the distance between the projections 26 and 27, and the like. For example, the first beveled surfaces 26a and 27a may be formed over the whole area of the inner wall surfaces of the projections 26 and 27.

I claim:

1. An apparatus for incorporating a lock plate in a video cassette, wherein a lock plate composed of:
   (a) a sheet-like plate body,
   (b) protrusions protruding from the plate body in a direction approximately normal thereto,
   (c) a shaft combined integrally with the plate body and extending adjacent and approximately parallel to the plate body, and
   (d) a torsion spring having a coiled portion engaged with the shaft, is incorporated in a cassette case body of a video cassette in order to allow a guard panel of the video cassette to be locked in a closed position, which video cassette is composed of the cassette case body in which a magnetic tape is accommodated, and the guard panel mounted on a surface of the cassette case body, along which surface the magnetic tape slides, the apparatus for incorporating a lock plate in a video cassette comprising:
   (i) a plate holding means which holds said lock plate in an obliquely inclined orientation so that the surface of said plate body, on which surface said protrusions are formed, faces down obliquely and so that said shaft extends horizontally above said plate body, and
   (ii) a fitting means which grasps the lock plate held by said plate holding means, moves it linearly while keeping it in the inclined orientation, and thereby fits said lock plate into said cassette case body.

2. An apparatus for incorporating a lock plate in a video cassette as defined in claim 1 wherein said plate holding means is provided with a spring push means which pushes a leg portion of said torsion spring, which torsion spring is engaged with said shaft of said lock plate, against the surface of said plate body on the side opposite to the surface on which said protrusions are formed.

3. An apparatus for incorporating a lock plate in a video cassette as defined in claim 1 wherein said plate holding means comprises a plate holding surface which is inclined and which has recesses for receiving said protrusions of said lock plate.

4. An apparatus for incorporating a lock plate in a video cassette as defined in claim 1 wherein said fitting means comprises a pair of grasping members, and one of said grasping members has a step-like part which pushes a leg portion of said torsion spring toward said plate body.

* * * * *